July 18, 1939.  F. L. GORMLEY  2,166,106
BALL-BEARING SCREW AND NUT FOR LIFTING JACKS AND SIMILAR DEVICES
Filed Feb. 4, 1938  2 Sheets-Sheet 1
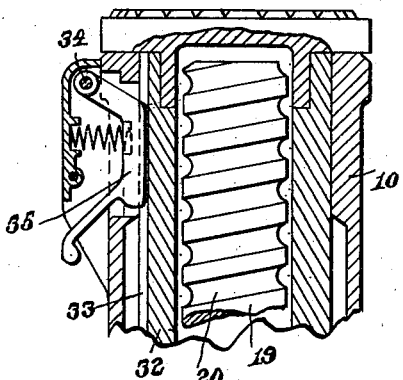
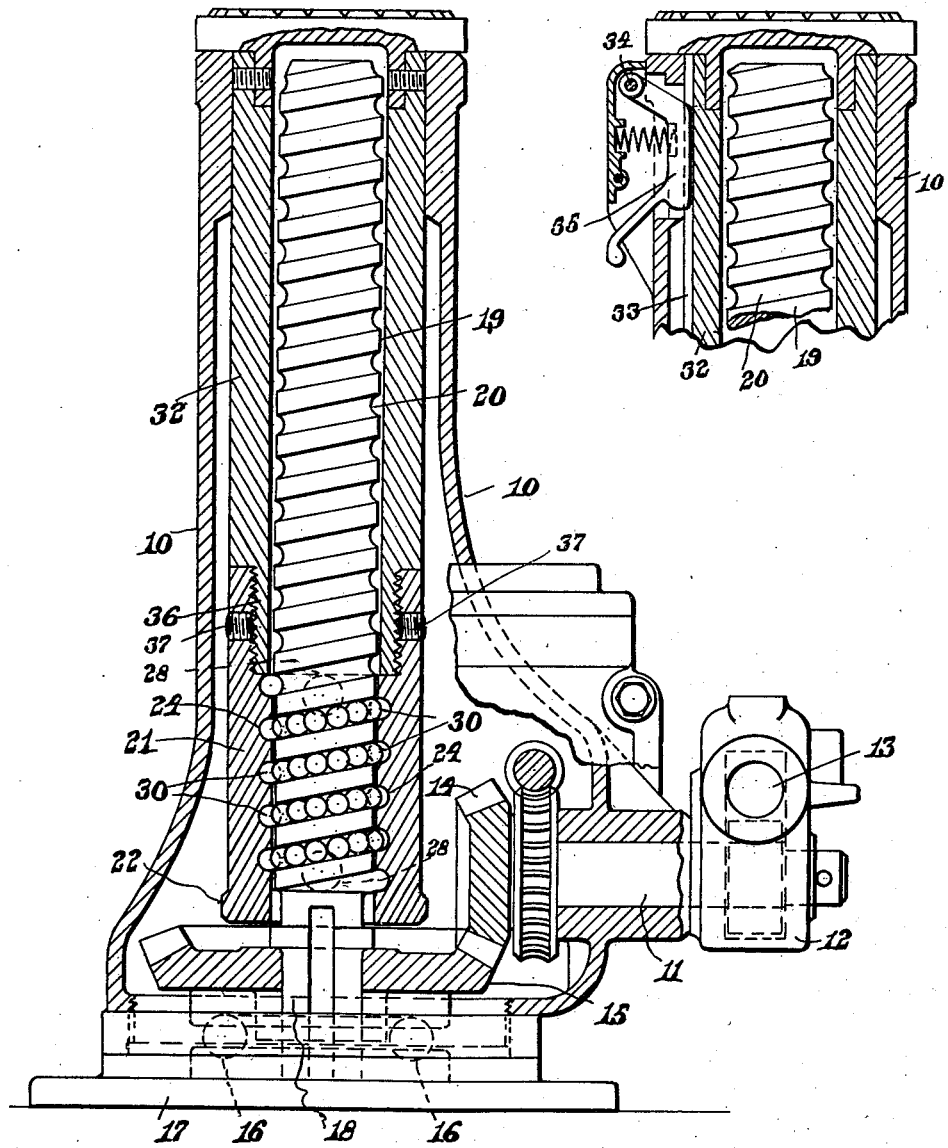
Inventor:
Frank L. Gormley,
by Walter E. Lombard
Atty.

July 18, 1939.  F. L. GORMLEY  2,166,106
BALL-BEARING SCREW AND NUT FOR LIFTING JACKS AND SIMILAR DEVICES
Filed Feb. 4, 1938  2 Sheets-Sheet 2
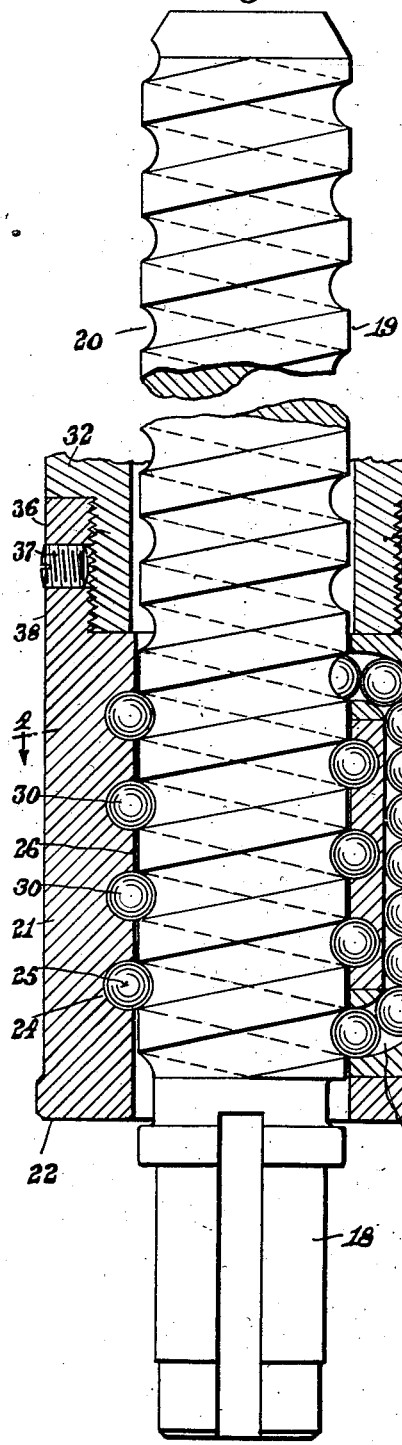
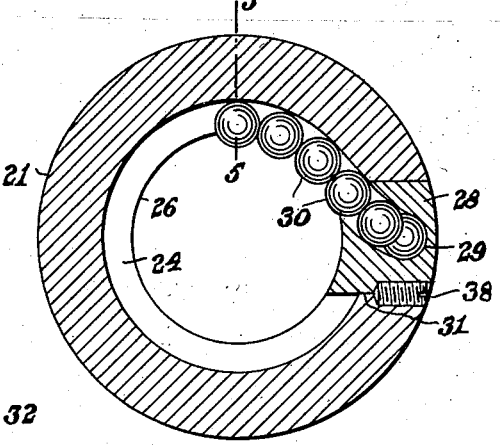
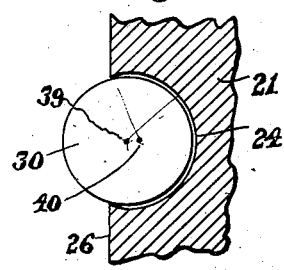
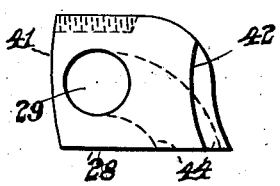
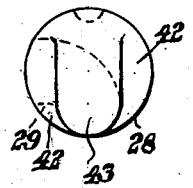
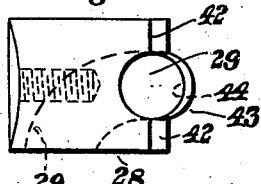
Inventor:
Frank L. Gormley,
by Walter E. Lombard.
Atty.

Patented July 18, 1939

2,166,106

UNITED STATES PATENT OFFICE 2,166,106

BALL-BEARING SCREW AND NUT FOR LIFTING JACKS AND SIMILAR DEVICES

Frank L. Gormley, Brookline, Mass., assignor to The Buda Company, Harvey, Ill., a corporation of Illinois Application February 4, 1938, Serial No. 188,717

7 Claims. (Cl. 74—459)

This invention relates to ball bearing screws and nuts particularly adapted for use in lifting jacks and similar devices in which a rotatable screw immovable endwise is adaped to coact with a non-rotatable nut is adaped to move it endwise for the purpose of raising or lowering a ram or other similar member.

The present invention consists of a screw having a helical thread in the form of a shallow concaved groove, and surrounding said screw, a nut having an endless cylindrical passage for a continuous train of balls, a portion of said passage being helical, said helical portion extending through the inner wall of the nut to permit a small portion of each of said balls to be disposed in said shallow concaved groove of the screw.

The invention further consists in making the helical portion of the cylindrical passage with its center spaced outwardly from the inner wall of the nut so that the balls confined therein cannot, under any condition, escape from said passage, the opening through the wall of the nut having a width less than the diameter of the balls in the endless passage.

The invention further consists in providing a straight portion of the passage extending endwise of said nut and connecting the opposite ends of the helical portion of the passage.

The invention further consists in providing the opposite ends of the nut with removable blocks having openings therethrough forming connections between the straight and helical portions of the endless passage.

One object of the invention is to provide a practical means for using steel balls to reduce friction between the screw and nut.

Another object of the invention is the construction of said nut in such a manner that said balls cannot escape from the nut even when said nut is removed from the screw.

A further object is to provide means whereby the angular load will force the balls inwardly into the helical portion of the ball passage in the nut so that the load will be carried on the center of said balls.

These objects are attained by the mechanism illustrated in the accompanying drawings.

For the purpose of illustrating the invention, one preferred form thereof is illustrated in the drawings, this form having been found to give satisfactory and reliable results, although it is to be understood that the various instrumentalities of which the invention consists can be variously arranged and organized, and the invention is not limited to the precise arrangement and organization of these instrumentalities as herein shown and described except as required by the scope of the appended claims.

Of the drawings

Figure 1 represents an elevation, partly in section, of a lifting jack provided with a ball bearing screw and nut embodying the principles of the present invention.

Figure 2 represents a detail in section of the means for preventing the rotation of the ram.

Figure 3 represents an enlarged section of the ball bearing screw and nut.

Figure 4 represents a transverse section on line 4, 4, on Fig. 3.

Figure 5 represents an enlarge section on line 5, 5, on Fig. 4.

Figure 6 represents a plan of one of the removable blocks of the nut.

Figure 7 represents a side elevation of the same, and

Figure 8 represents an elevation of the inner end of said removable block.

Similar characters indicate like parts throughout the several figures of the drawings.

In the drawings, 10 is the casing of a self-lowering lifting jack of usual construction.

In a bearing in said casing 10 is a rotatable shaft 11 having secured to its outer end a device 12 by which said shaft may be rotated as desired by means of a lever inserted into the socket 13. As this device 12, 13 forms no part of the present invention it is deemed unnecessary to illustrate it in detail.

At the inner end of the shaft 11 is a bevel pinion 14 which meshes with a bevel gear 15 resting on anti-friction members 16 in the base 17 of the casing 10 as is usual in this type of lifting jacks.

The gear 15 is keyed to the lower end 18 of a rotatable screw 19 extending upwardly in said casing 10 as indicated in Fig. 1 of the drawings.

The screw 19 is provided with a continuous helical thread 20 in the periphery thereof, said thread being in the form of a shallow concaved groove.

Surrounding said screw 19 is a nut 21 having projecting from the lower end thereof a flange 22.

This nut 21 is provided on its inner face with a helical groove 24. This groove 24 is semi-cylindrical with the center 25 thereof spaced outwardly from the inner wall 26 of the nut 21.

At one side of the nut 21 is formed a straight cylindrical passage 27 and at opposite ends of this passage are removable blocks 28 having curved openings 29 therethrough, one end of each opening 29 registering with the end of the passage 27 and the opposite end of said opening registering with the groove 24.

By this construction an endless passage is formed consisting of the straight cylindrical passage 27, the curved openings 29 and the helical groove 24, and in this endless pasage is disposed a continuous train of balls 30 contacting with each other.

As the screw 19 is rotated the balls 30 will travel continuously through the passage 27, openings 29 and groove 24.

By having the center of the semi-cylindrical inner walls of the helical groove 24 spaced outwardly from the inner wall 26 of the nut 21 and the outer walls of said groove concentric to another center disposed nearer the outer wall of the nut the opening between the groove 24 and the inner wall 26 of the nut is less than the diameter of the balls 30 contained within said groove 24, consequently these balls 30 are always retained within the groove 24 and cannot be accidentally displaced therefrom even when the nut 21 is removed from the screw.

Less than one half of each ball 30 projects inwardly from the inner wall 26 of the nut 21 and travels in the shallow concaved groove of screw 19.

The balls in the groove 24 have a diameter less than the diameter of the inner semi-cylindrical part of said groove 24, as shown in Fig. 5 of the drawings.

In order to deposit the balls 30 in the endless passage of the nut 21, the upper block 28 may be removed and the balls inserted into the upper end of the passage 27 until the groove 24 and passage 27 are filled with balls contacting with each other and then with other balls 30 positioned in the openings 29 in said block 28, the block 28 may be driven into position in the hole 31 provided therefor in the wall of the nut 21 and secured in position by headless screws 38 which prevent rotation and end movement of said block 28.

Superimposed upon the nut 21 is a cylindrical ram 32 having a groove 33 extending longitudinally of its periphery.

Pivoted at 34 to the casing 10 of the lifting jack is a spring pressed locking member 35 which is adapted under normal conditions to enter and coact with said groove 33 to prevent the ram 32 from rotating, while permitting said ram to move vertically when the screw 19 is rotated.

The locking member 35 is shown as one practical means for preventing the rotation of the ram 32, although it must be understood that other means projecting into the groove 33 will serve the same purpose.

The ram 32 may be provided at its lower end with an annular projection 36 threaded into a recess formed in the upper part of the nut 21 as shown in Fig. 1 of the drawings, thereby connecting the ram 32 to the nut 21.

The nut 21 is secured at its upper end to the annular threaded projection 36 by means of screws 37, the inner ends of which impinge upon the thread of said projection 36, thus preventing rotation of the ram 32 and nut 21 relatively to each other.

Preferably the blocks 28 are cylindrical with their axes coinciding with the center of the helical groove 24, and when driven into the holes 31, they are locked in position by headless screws 38, one side of each screw 38 being in the body of the nut 21 and the other side being threaded to the block 38 thus preventing the rotation or displacement of said block.

Preferably the outer periphery of the screw 19 is slightly spaced from the inner wall 26 of the nut 21, thereby preventing any friction between the periphery of screw 19 and the inner wall 26 of the nut 21.

The endless ball passage 24, 27 and 29 may be filled with grease or other lubricant, thereby insuring continuous lubrication of the balls 30 as they travel through said endless passage.

By providing this lubrication in the endless passage the ball bearing requires very little, if any, attention after the screw and nut has been assembled.

When the nut 21 has been loaded with the correct number of balls 30, these balls cannot escape from the groove 24 of the nut 21, inasmuch as the opening of the groove 24 extending through the inner wall 26 of the nut 21 is smaller than the diameter of the balls 30.

Consequently, the groove 24 of the nut, the straight passage 27, and the openings 29 in the blocks 28 will always retain the full complement of balls, if and when the screw 19 is removed from said nut 21.

It will be noted that in seating the balls 30 in the groove 24 of the nut 21, over one half of the diameter of each ball is in the groove and this allows the outer portion of the groove 24 to be smaller than the full diameter of the balls 30, thus forming a means for holding the balls within the groove 24 under all conditions.

The main portion of the groove 24 is semi-cylindrical with its center at 39, while in order to retain the balls 30 in said groove the remainder of the wall of said groove 24 has its center at 40.

This construction of the groove 24 effectually prevents the displacement of the balls 30 from said groove.

By thus seating the balls 30 in the nut 21 in the manner just described, the said balls 30 are permitted to follow a more natural course when changing direction of rotation from the radius of the thread or groove 20 in the screw 19 and groove 24 of the nut 21 when passing into one end of the vertical straight passage 27 at one side of said nut or passing from the opposite end of passage 27 into the groove 24.

By thus constructing the ball bearing for the screw 19 it is possible to use larger size ball bearings without having the nut 21 and the screw 19 out of proportion.

Moreover, the threads or grooves of the screw 19 and the grooves 24 of the nut 21 are much stronger and will sustain great weight.

It has been found in practice that by the use of this form of ball bearing for the screw 19, said screw will stand a higher twisting strain.

The balls 30 will carry the load easier and follow the helical angle of the thread therein with less friction when a load is being lifted.

By construction of the ball bearings in the manner described and with larger diameter of ball bearings, a lower pitch of thread is possible in both screw 19 and nut 21.

While as shown in the drawings and hereinbefore described the screw 19 is revoluble and prevented from endwise movement, and the nut is non-revoluble but movable endwise, it is self-evident that for some particular work these operations may be reversed and the nut may be revoluble and immovable endwise while the screw is non-revoluble but movable endwise.

It is obvious, also, that the balls 30 may be inserted into the endless passage of the nut 21 either when removed from the screw 19 or while the screw is inserted therein.

When the screw 19 is being rotated to raise the ram 32 the tendency is for the lower side of the groove 20 in the screw 19 to force the balls toward the upper side of the grooves 24 in the nut 21.

Consequently, the angular load will force the balls 30 into the groove 24 of nut 21 and cause the load to be carried on the center of the balls 30.

As shown in Figs. 6, 7 and 8 the blocks 28 are of peculiar construction being round with their outer ends 41 curved to correspond with the periphery of the nut 21, while portions 42 at the inner end thereof are curved to substantially conform with the inner wall 26 of the nut 21.

The passage 29 therethrough is so constructed that when the block 28 is in place, one end will coincide with an end of the straight passage 27 while the other end thereof will register with the groove 24.

Between the curved portions 42 the inner end of the block 28 is provided with a curved projection 43 which extends over the end 44 of the passage 29 where it registers with the groove 24.

This construction of ball bearing provides for a more natural course of travel of the balls 30 when ascending or descending the helical angle of the screw thread 20.

The construction of ball bearings as herein shown and described makes a very practical means for reducing friction between the balls 30 and the surfaces of the thread in both the screw 19 and nut 21, this being especially true when heavy loads are encountered and where speed and reduced friction is required.

While the ball bearing is particularly adapted for use in lifting jacks as herein shown and described, it is self-evident that the same construction of ball bearings may be used for a variety of other purposes.

It is believed that the operation and many advantages of the invention will be understood without further description.

Having thus described my invention, I claim:

1. The combination of a rotatable screw prevented from end movement and having a widely separated helical concaved groove; a non-rotatable cylindrical nut surrounding said screw and provided with an endless ball passage, a portion of which is helical and extends through the inner wall of said nut with its center spaced outwardly from said inner wall; a cylindrical block disposed in the cylindrical wall of said nut having curved openings therein connecting the opposite ends of the helical portion of said passage with the opposite ends of a straight portion of said passage extending lengthwise of said nut, the inner end of said block being provided with a curved groove, the wall of which forms a part of the ball passage; and a continuous train of balls confined within said passage with the small portions of said balls disposed within the groove of said screw while moving through the helical portion of the ball passage.

2. The combination of a rotatable screw prevented from end movement and having a shallow helical concaved groove separated by wide cylindrical surfaces; a non-rotatable cylindrical nut surrounding said screw and provided with an endless ball passage, a portion of which is helical and extends through the inner wall of said nut with its center spaced outwardly from said inner wall; and a continuous train of balls confined within said passage with small portions of said balls coacting with the groove of said screw while moving through the helical portion of said ball passage, the cylindrical wall of said nut having lateral cylindrical openings near the opposite ends thereof in which are disposed insertable blocks having curved openings therethrough connecting the straight and helical portions of said passage, said blocks being provided with means preventing rotation and endwise movement thereof.

3. The combination of a screw having a shallow helical groove and a cylindrical nut coacting therewith, one of which is non-rotatable while the other is rotatable but immovable endwise, said nut being provided with a continuous train of balls adapted to travel endwise of said nut in an endless ball passage therein with minor portions of some of said balls disposed within the shallow helical groove of said screw, said ball passage having a portion thereof helical and extending through the inner wall of the nut, continuous means being provided on said nut for the entire length of the helical portion of said passage to prevent the displacement of said balls from said helical portion of the ball passage, and means whereby the balls may be inserted into said ball passage through radial openings in and between the opposite ends of the cylindrical wall of said nut.

4. The combination of a screw having a shallow helical groove and a nut coacting therewith, one of which is non-rotatable while the other is rotatable but immovable endwise, said nut being provided with a continuous train of balls adapted to travel endwise of said nut in an endless passage therein with minor portions of some of said balls coacting with the shallow helical groove of said screw, a portion of said passage being helical and extending through the inner wall of said nut, said inner wall having continuous oppositely disposed curved walls extending toward each other throughout the entire length of the helical portion of said passage to prevent the displacement of said balls from the helical portion of said passage, the inner wall of the helical portion of said ball passage and said oppositely disposed curved walls being continuous and concentric to different centers.

5. The combination of a screw having a shallow helical groove and a nut coacting therewith, one of which is non-rotatable while the other is rotatable but immovable endwise, said nut having therein a continuous ball passage a portion of which is helical and extends through the inner wall of the nut, said nut being provided with a continuous train of balls adapted to travel endwise of said nut and some of the balls in the helical portion of said endless passage having minor portions thereof extending into the shallow helical groove of said screw, the inner wall of the helical portion of said passage being semi-cylindrical with its center spaced outwardly from the inner cylindrical wall of the nut thereby permitting less than half of each ball to extend into the shallow helical groove of said screw, the diameter of the semi-cylindrical wall being greater than the diameter of said balls, and means on said nut comprising continuous curved projections extending toward each other for the entire length of the helical portion of the ball passage to prevent the displacement of said balls from the helical portion of said passage, the inner walls of said projections being concentric to a center near the outer cylindrical wall of the nut.

6. The combination of a rotatable screw prevented from end movement and having a helical concaved groove; a non-rotatable nut surrounding said screw and provided with an endless ball passage, a portion of which is helical and extends through the inner wall of said nut, the inner wall of said helical portion being semi-cylindrical with its center spaced outwardly from the inner wall of said nut; a cylindrical block disposed in the cylindrical wall and between the opposite ends of said nut having curved cylindrical openings therein connecting the opposite ends of the helical portion of said passage with the opposite ends of a straight portion of said passage extending lengthwise of said nut; and a continuous train of balls confined within said passage with minor portions of said balls disposed within the shallow helical groove of said screw while moving through the helical portion of the ball passage.

7. The combination of a rotatable screw prevented from end movement and having a shallow helical concaved groove; a non-rotatable nut surrounding said screw and provided with an endless ball passage, a portion of which is helical and extends through the inner wall of said nut, the inner part of said passage being semi-cylindrical with its center spaced outwardly from said inner wall; insertable and removable blocks near and between the opposite ends of said nut having curved cylindrical openings therethrough connecting the straight and helical portions of said ball passage; and a continuous train of balls confined within said passage with minor portions of the balls when in the helical portion coacting with the shallow helical groove of said screw.

FRANK L. GORMLEY.